United States Patent

[11] 3,634,665

[72] Inventors William C. Carter
 Ridgefield, Conn.;
 Peter R. Schneider, Peekskill, N.Y.
[21] Appl. No. 837,596
[22] Filed June 30, 1969
[45] Patented Jan. 11, 1972
[73] Assignee International Business Machines
 Corporation
 Armonk, N.Y.

[54] SYSTEM USE OF SELF-TESTING CHECKING CIRCUITS
 9 Claims, 12 Drawing Figs.
[52] U.S. Cl.................................................. 235/153,
 307/204, 307/219, 340/146.1, 340/332
[51] Int. Cl....................................................... G06f 15/16
[50] Field of Search......................................... 340/331,
 146.1; 307/204, 208, 219, 239, 269; 235/153

[56] References Cited
 UNITED STATES PATENTS
 3,229,251 1/1966 Homan et al. ................ 340/146.1

OTHER REFERENCES

Teuber, M. et al., Blinkgeber fur Signalanlagen, insbesondere fur Signalleuchten von Kraftfahrzeugen. Deutches Auslegeschrift 1215559, 28 Apr. 1966.

Primary Examiner—Malcolm A. Morrison
Assistant Examiner—R. Stephen Dildine, Jr.
Attorneys—Hanifin and Jancin and Roy R. Schlemmer, Jr.

ABSTRACT: A self-testing error-checking system for inclusion in a computer comprising a plurality of self-testing check circuits, each said circuit having a two-rail complementary output whenever both the circuits being tested and the checking circuit is operating properly and an identical output on each of the two output lines whenever a fault is detected. The improvement which comprises reduction checking means connected to all said two-rail outputs from said checking circuits, and means connected to the output of said reduction checker means for at least indicating that a failure has occurred. The output of said reduction checker itself is two rail and complementary when all inputs are correct and the checker itself is operating properly. The output of the present checking system may be connected to a computer interrupt circuit or to a visual logout means. Alternatively, the system output may be utilized to effect automatic self-repair.

REDUCTION CIRCUIT
FOR CHECKER OUTPUT
(RCCO)

REDUCTION CIRCUIT FOR CHECKER OUTPUT (RCCO)

INVENTORS
WILLIAM C. CARTER
PETER R. SCHNEIDER

BY
ATTORNEY

SYSTEM USE OF SELF-TESTING CHECKING CIRCUITS

CROSS-REFERENCES TO RELATED APPLICATIONS

U.S. Pat. application Ser. No. 744,888 of W. G. Bouricius et al., filed July 15, 1968 entitled "Status Switching In An Automatically Repaired Computer."

U.S. Pat. application Ser. No. 747,522 of W. C. Carter et al., filed July 25, 1968 entitled "Self-Checking Error Checker for Parity Coded Data."

U.S. Pat. application Ser. No. 747,533 of W. C. Carter et al. filed July 25, 1968 entitled "Self-Checking Error Checker For Two-Rail Coded Data."

U.S. Pat. application Ser. No. 747,665 of W. C. Carter et al. filed July 25, 1968 entitled "Self-Checking Error Checker For $k$-Out-Of-$n$ Codes."

The first of the above dockets discloses essentially fail-safe switching circuitry for connecting computer modules to one another so that any switching failures will be essentially eliminated or at least greatly minimized. The latter three copending applications disclose various types of self-testing error-checking circuits suitable for use as the initial error detection organs of the presently disclosed system. The particular areas in which reference to these applications is made will be clearly set forth in the subsequent description of the present invention.

BACKGROUND OF THE INVENTION

As present-day electronic computers become ever more complex and sophisticated, the numbers of circuits have increased to gigantic proportions with a concurrent reduction in time for performing a given computation. With this large increase in the total numbers of circuits in today's modern complex computing systems, it will be apparent that the number of locations at which an error or fault can occur has been greatly increased. Moreover, if a given faulty component is producing incorrect data, a great many more errors or incorrect computations will be produced in a very short space of time until the fault is corrected than would have been the case with slower less sophisticated machines. In the past, many schemes have been proposed for detecting errors in various sections of a computing system. Probably the most wide-spread method of detecting errors is the use of parity coding and checking wherein an extra bit or bits accompany transmitted data bits within a system and are utilized at various points to indicate the proper data content of a particular transmission, i.e., normally the parity bit indicates whether an odd or even number of ones appears in the data transmission proper. However, for such parity-checking systems, means must be provided for detecting and generating the proper parity bits at various transmission points within the computer and additional means must be provided for checking the parity. In the past, most checking systems have not themselves been checkable during normal data processing. In other words, if the checker failed so as to indicate an "error-free" condition, subsequent errors would obviously go undetected until some other means picked up the error occurring in the checker per se. With the increasingly greater load, which must be borne by customer or maintenance engineers who have the responsibility of maintaining and repairing computers, any reliable diagnostic circuits built into a computer system are of invaluable aid both in terms of indicating that an error is present in the system and wherever possible the precise location of the faulty hardware. In the past, the provision of large amounts of error detection circuitry has been prohibitive in terms of hardware cost; however, with the vastly more complex present-day computers and the extreme difficulty in obtaining and training qualified service personnel, the overall cost advantages of providing reliable diagnostic equipment and techniques built into the computer circuitry proper are becoming more apparent. Further, the advent of integrated circuit technology is rapidly reducing the cost of individual circuit blocks to the point where heretofore financially unfeasible hardware installed for the purpose of error detection and/or correction is beginning to be looked on more favorably by systems architectural engineers.

The previously referenced copending applications represent hardware designs wherein actual error testing or checking circuits are disclosed wherein the circuits provide an indication as to whether or not they are themselves error free while at the same time checking other inputs from different circuits. These applications were not concerned with the particular use made of the various error detection information obtained.

It is the purpose of the present invention to set forth techniques and apparatus for specifically utilizing the information available from such self-testing checking circuits so that their outputs many be utilized to effectively give a reasonable indication of fault location, initiate retry procedures, automatically shut down a defective computer or component thereof, or initiate self-repair procedures.

SUMMARY OF THE INVENTION AND OBJECTS

The present invention teaches some generalized techniques for utilizing self-testing error-checking circuits in a system configuration. According to one aspect of the invention, the outputs of the various error-checking circuits are grouped together to provide both a visual indication of system failures and also to effect certain minimal computer control functions in response to any detected failures. According to a further aspect of the system, techniques for arranging such failure reduction circuits into hierarchical configurations wherein substantially reduced circuits may be utilized to provide reasonable precise fault location is set forth. According to a still further aspect of the present invention, a number of techniques for effecting automatic system self-repair are taught wherein the performance of redundant modules is monitored and said modules switched into and out of the overall system as needed.

It is accordingly a primary object of the present invention to provide an overall computer system organization having built-in failure detection and fault location facilities.

It is another object of the system to provide such a circuit wherein special failure reduction monitoring circuits are utilized to simplify certain diagnostic procedures.

It is yet another object of the invention to provide such a system wherein special means are provided for automatically interrupting system operation in the event of a fault detection.

It is another object of the invention to provide such a system wherein visual fail-safe logout means are provided.

It is yet another object of the invention to utilize such a self-checking system to automatically remove a faulty system module from the overall system when a fault in either the system or in the checking circuitry is discovered.

It is a still further object to provide such a system as just set forth wherein means are provided for automatically retrying a previously removed module.

The foregoing and other objects, features and advantages of the invention will be apparent from the following more particular description of preferred embodiment of the invention, as illustrated in the accompanying drawings.

DESCRIPTION OF THE DISCLOSED EMBODIMENTS

The objects of the present invention are accomplished in general by a self-testing error-checking system for use in a computer system including a plurality of individual self-testing error-checking circuits connected to various portions of the computer system for monitoring purposes. Each error-checking circuit has a two-rail complement output, when the inputs are all correct and the checking circuit itself is functioning properly, said system comprising, at least one reduction circuit means for receiving as input data a plurality of said checker two-rail outputs, said reduction circuit producing a two-rail complement output when all inputs are correct and said circuit is itself functioning properly and means for producing a system failure indication whenever the two-rail output from said reduction circuit is not complementary.

According to the most basic aspect of the present invention, this two-rail output may be utilized to illuminate a visual error indicator whereby a predetermined pattern appearing in said indicator indicates improper operation of the system. According to a further aspect, the two-rail reduction circuit output may be utilized in addition to actuate a fail-safe stopping switch which inhibits any further machine operation subsequent to the detected erroneous system operation.

Figure 5:
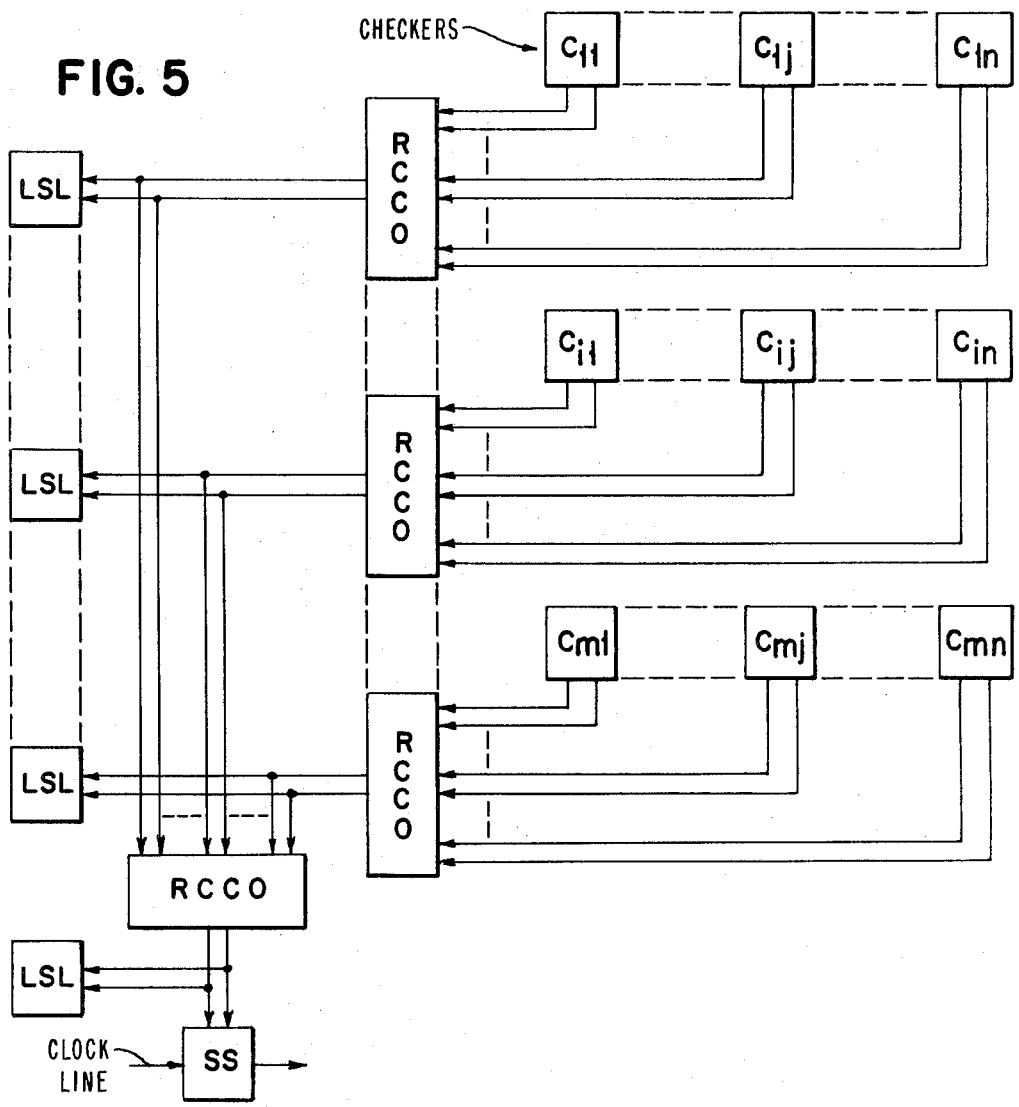
FIG. 5 is a functional block diagram of a simplified hierarchical reduction circuit system.
Figure 6:
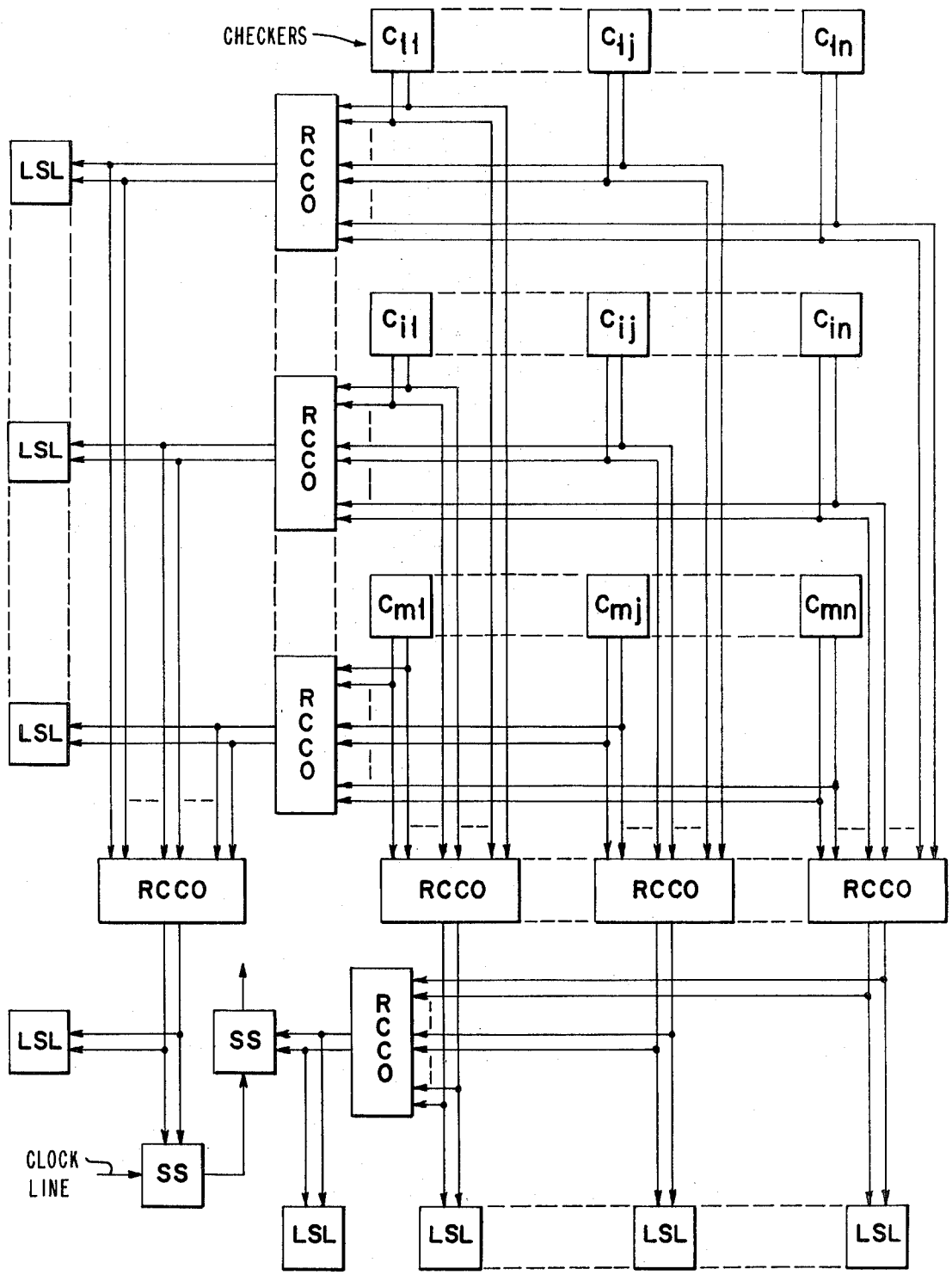
FIG. 6 is a functional block diagram of an array reduction analysis circuit utilizing the techniques generally disclosed in FIG. 5 in a matrix form.

The specific self-testing error checking and reduction systems of FIGS. 5 and 6 essentially utilize hierarchies of reduction circuits for receiving the outputs of a relatively large number of individual error detection circuits wherein a maximum amount of fault location is possible utilizing the present system with a minimized quantity of extra circuitry.

Figure 7:
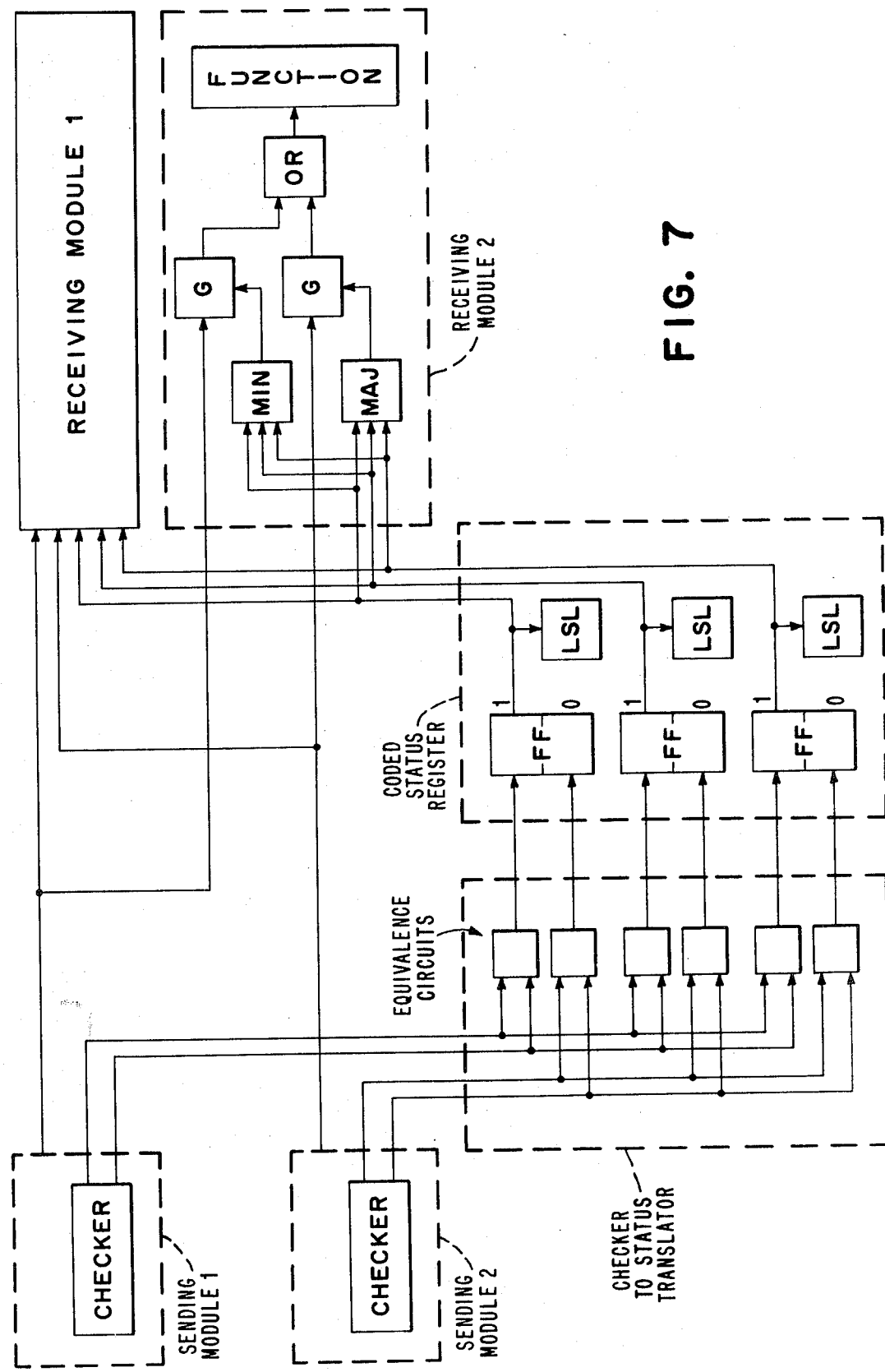
FIG. 7 comprises a combination functional block diagram and logical schematic diagram of a system utilizing the self-testing circuits disclosed to attain system self-repair by selecting a properly operating module.
Figure 8:
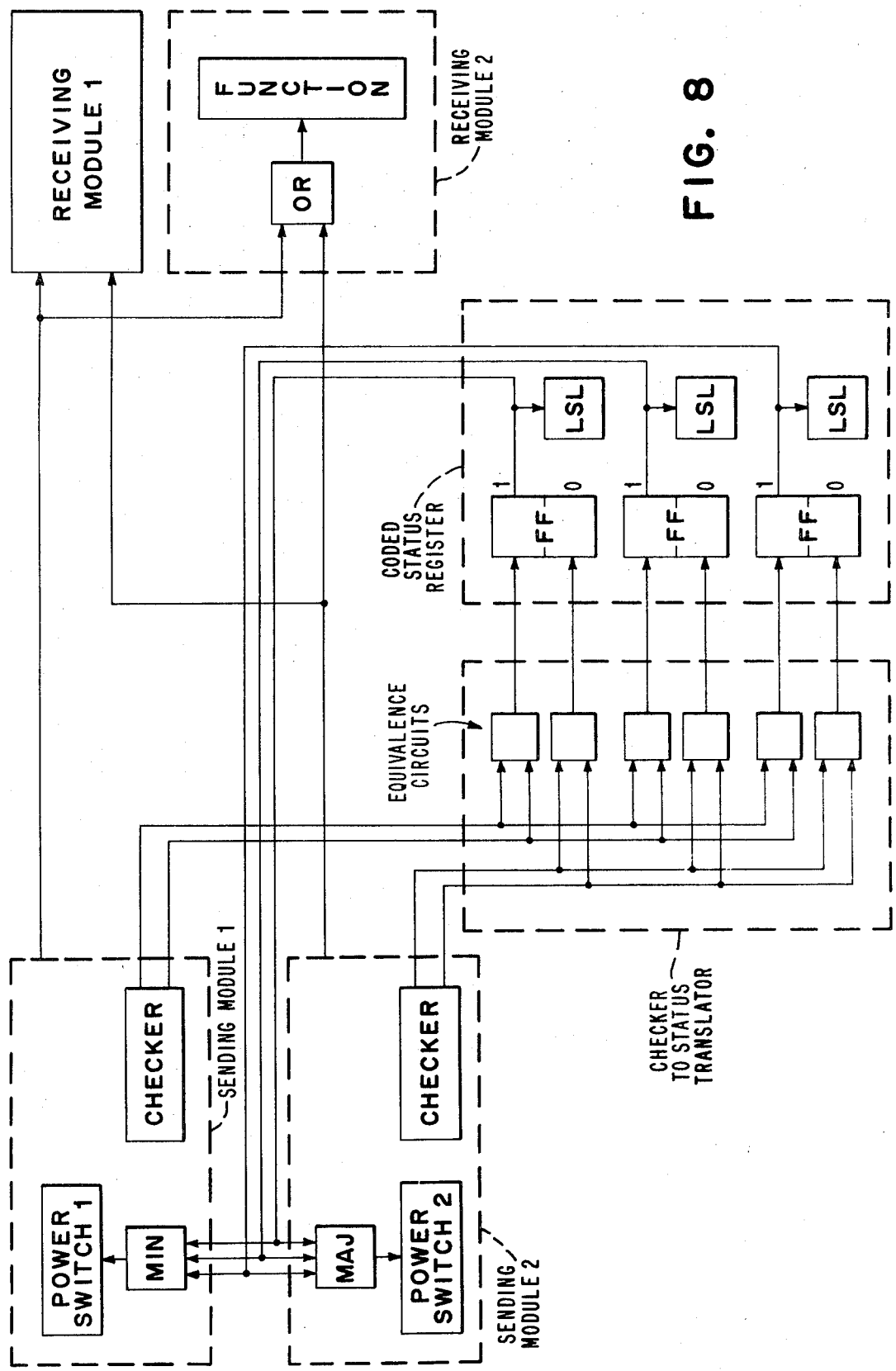
FIG. 8 comprises a combination functional block diagram and logical schematic diagram of a system utilizing the self-testing circuits disclosed to attain system self-repair by turning off or disconnecting bad modules from the system.

According to a still further aspect of the present invention as set forth in FIGS. 7 and 8, the concepts of the present error-checking system are utilized with highly redundant system configurations wherein automatic switching means are connected to the outputs of the individual checking systems which automatically effect self-repair of the particular computing systems involved. Generally, this is accomplished by substituting a good operating module for a bad module.

Before preceding with the description of the disclosed embodiments, a number of observations should be made relative to the reduction circuits for the checker outputs abbreviated RCCO in the remainder of the specification. The specific circuits disclosed here are essentially similar to those disclosed in the above-referenced copending U.S. Pat application Ser. No. 747,533 of W. C. Carter et al. As is stated in that application, each of these reduction circuits acts or performs in much the same way as the individual self-testing error checkers of said copending application. Such circuits are required to have two primary characteristics. The checker output must distinguish the presence of code message inputs and error messages inputs, i.e., code message inputs produce one set of checker outputs and error message inputs produce a completely different set of checker outputs. For every given failure in the checking circuit itself, there should exist at least one valid code message input which tests for that given failure, i.e., given the failure when the proper code message is applied, the checker will produce an output different from that produced when code messages are applied to a correctly functioning checking circuit. The first characteristic insures that the checking circuit can be used to detect the presence of error messages. The second characteristic insures that the checking circuit is completely self-testing during the normal processing of code messages. Special mechanisms to test for the correct operation of the checking circuitry itself are thus eliminated.

These two characteristics require that the checking circuits have more than one output. If only one output existed, the first characteristic would require that the output take on one value, say "1" for code messages and the opposite value, say "0," for error messages. But then the second characteristic could not be satisfied since the checker output could fail in the stuck-at-one position or no error and the application of code messages would never detect this failure. It should further be noted that such a failure would also disable all future error detection ability. Thus, more than one output is mandatory. In general, the multiple-output checking circuits have their possible output states divided into two classes called the code state and the error state with the code state being associated with correct operation. For example, by having two-rail complementary outputs for the code state of a two-output checker, if one of the outputs should become stuck at one, a valid code message is available which would check this condition, i.e., the valid code message would produce an identical, i.e., "11," output for certain valid input code conditions. Two output checkers will be discussed here exclusively since they are the simplest multiple-output case, but it should be clear that the basic concepts extend to more than two outputs.

It should further be noted that it is not the design of the two-rail input error-checking circuit per se, which comprises in essence the reduction circuit of the present system, but the way in which these error-checking circuits, as examples of the general multiple-output case, are utilized in the overall system concept which constitutes the subject matter of the present invention. The specific circuitry per se has been disclosed and claimed in said copending application Ser. No. 747,533.

The requirements on the design of error-checking circuits per se, which insure that they be self-testing during normal processing of code element inputs were specified in the previously referenced copending applications Ser. Nos. 747,522; 747,533; and 747,665). It will be assumed through out the remaining description that only one failure occurs at a time, i.e., the design is such that the mean time between failure is much greater than the means time to detect and repair a failure. With no real loss in generality, it will also be assumed here that each checker has dual outputs with odd parity, 01 or 10, indicating no error in the input and no failure in the checking circuit and with even parity, 00 or 11, indicating either an error in the input or a failure in the checking circuit.

As far as the circuitry in the system analysis sections is concerned the checking circuit outputs which must be analyzed appear as normal two-rail encoded data lines, i.e., the code space is odd parity on each line pair. Thus the self-testing checking circuits for two-rail logic described in copending application Ser. No. 747,533, as stated previously, can be employed as reduction circuits on the checker outputs.

Figure 1A:
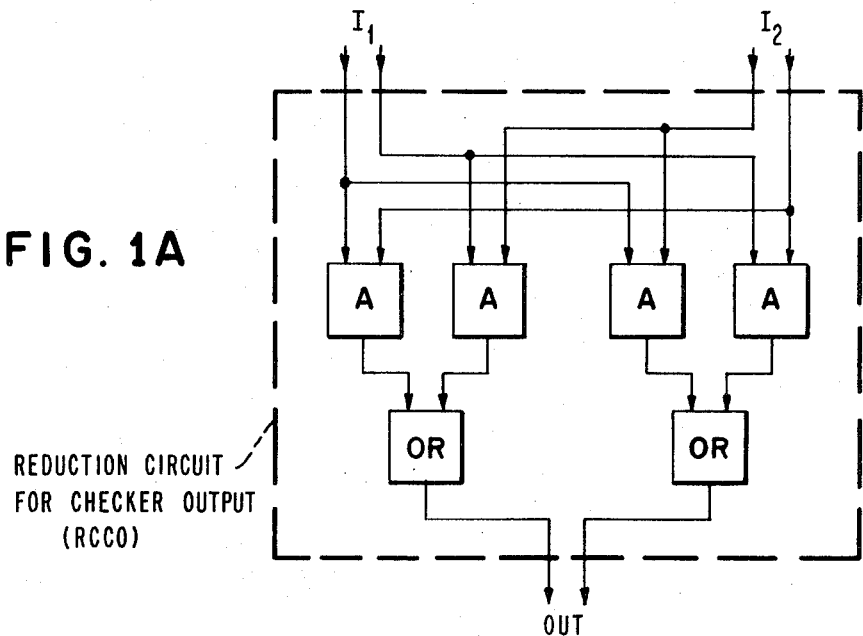
FIG. 1A comprises a logical schematic diagram of a basic reduction circuit for receiving the two-rail inputs from two error checkers.
Figure 1B:
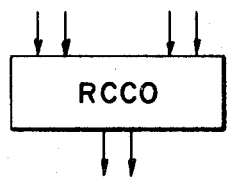
FIG. 1B illustrates the symbol utilized in the system diagram of FIGS. 4 and 5 for a two-input reduction circuit such as shown in FIG. 1A.
Figure 1C:
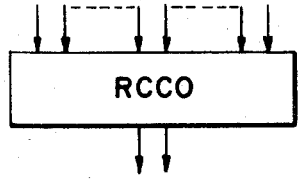
FIG. 1C indicates the symbol utilized for a reduction circuit such as shown in FIG. 1A having more than two inputs.

An example of such a reduction circuit, taken from application Ser. No. 747,533, is shown in FIG. 1A for the simplified case of two input data line pairs. When correctly functioning, odd parity on all input pairs produces odd-parity output. When incorrectly functioning, even parity on at least one input pair produces an even-parity output. When the checker itself fails, there exists at least one odd-parity input which causes an even-parity output. FIG. 1B shows the block symbol which will be used to represent this Reduction Circuit for Checker Outputs (RCCO). Application Ser. No. 747,533 specifically shows how circuits such as this can be constructed for any arbitrary number of input line pairs. The generalized block symbol used to represent such a multiple-input pair circuit is shown in FIG. 1C.

In the system use of such circuits to be described subsequently, it will frequently be necessary to use an RCCO output to stop the computer, provide a visual indication for logout, initiate a retry, etc.

Figure 2A:
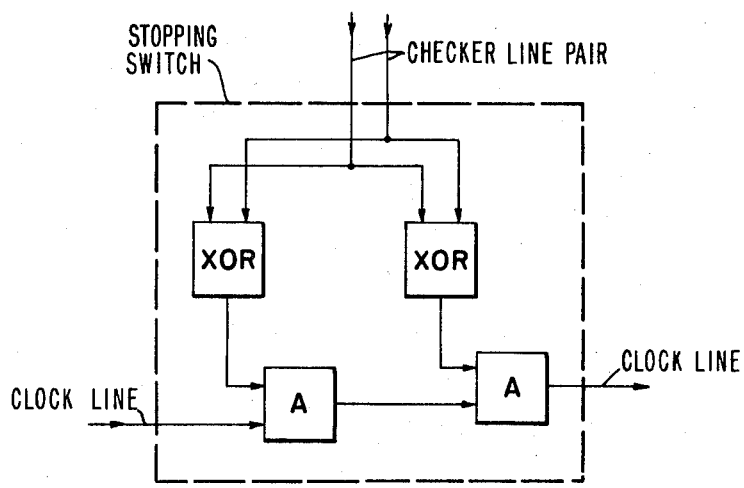
FIG. 2A is a logical schematic diagram of a stopping switch suitable for use in the embodiments set forth in the FIGS. 4, 5, and 6.

FIG. 2A is an illustration of what a redundant fail-safe stopping switch might look like. As long as the checker line pair has odd parity (indicating no failure) the clocking signals are gated on through. Even parity will cause both gates to open, thereby stopping the clock signals. The operation of the actual logic is believed to be obvious. Failures within the stopping switch either have no effect or stop the machine. In the latter case, the machine stops with a checker logout indicating no machine failure, hence a stopping switch failure would be the diagnosis.

Figure 2B:
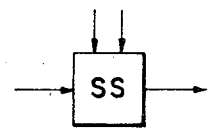
FIG. 2B is illustrative of the symbolic representation of the stopping switch of FIG. 2A.

FIG. 2B illustrates the symbol used in the remainder of the figures to designate such a stopping switch (SS).

Figure 3A:
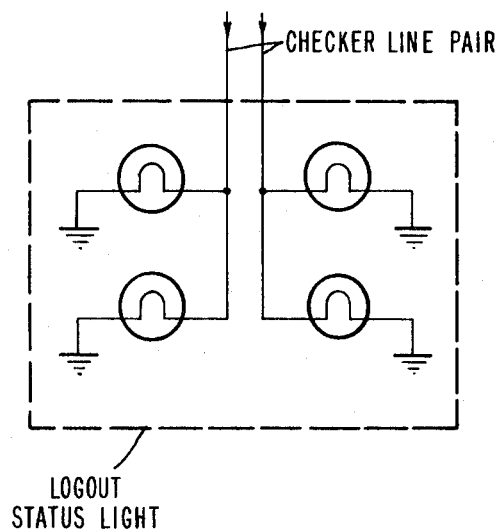
FIG. 3A comprises a schematic diagram of a special logout status light for connection to the output of one of the reduction circuits such as shown in FIG. 1A to provide a visual indication of the output status of the circuit.

The logout status light illustrated in FIG. 3A can be connected to any checker output and placed on the computer maintenance console. When the computer stops after a failure the status of the lights can be used to determine the status of the line pair:

01  10                                    00  11
01 or 10 indicates odd parity, 00 or 11 indicates even parity and anything else indicates a prior light failure which should be repaired first before the usual readout is made. Note that light failures can be picked up during normal operation. A good light will glow faintly since it is being turned on and off at a very high rate. A bad light will either be dark (stuck off) or very bright (stuck on).

Figure 3B:
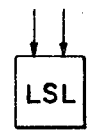

FIG. 3B illustrates the symbol used in the remainder of the figures to designate such a logout status light (LSL). The operation of the logic for this circuit is also believed to be obvious.

The circuits in both FIG. 2A and FIG. 3A are intended for illustrative purposes only. Many other such implementations exist and could be used in the system analysis sections to follow.

Figure 4:
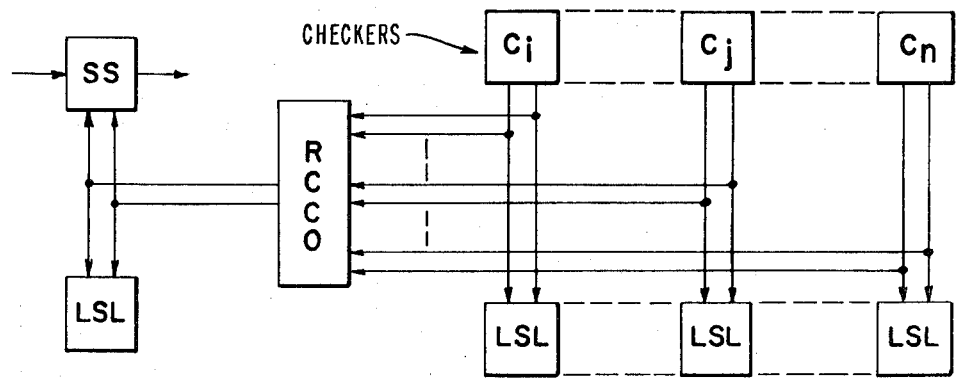
FIG. 4 is a functional block diagram illustrative of a very straightforward use of the present error-checking system concepts.

FIG. 4 comprises a simplified illustration of how a self-testing RCCO network can be used in a system with N checking circuits to provide a system failure indication and/or logout of the failure location. Table 1 indicates the logout status of the line pairs for failures occurring in various portions of the machine logic and checking circuits.

LSL's, as indicated, or any other such mechanism) and comparing the resulting patterns to the entries in Table 1. When error propagation occurs and more than one of the pairs $L_1 ... L_N$ is even, the failure location becomes more difficult. It now depends heavily on knowledge of possible directions of error propagation in order to select the checker at the source of the failure.

The major disadvantage with the system analysis circuit of FIG. 4 is that when N is large, say 100–1,000, the number of logout lines from the checkers becomes unwieldy. The circuit in FIG. 5 solves this problem at the price of a loss in resolution on the failure location. In this contact sets of related checkers are grouped as rows of an array and a reduction performed across their outputs by an intermediate RCCO circuit. From that point on the circuit is exactly as in FIG. 4 except for the fact that the number of intermediate RCCO's being logged out, $m$, is much less than the N checkers being logged out in FIG. 4. However, it is no longer possible to tell directly which checker in the set is indicating an error or failure condition since only the set itself is indicated. To minimize this uncertainty, it is highly desirable to select the checkers for a set so that error propagation cannot turn on checkers in more than one row. It is also clear that when checkers are grouped into a set for reduction they probably should belong to the same functional unit or field replaceable unit. This eases, or possibly obviates, the need to discover exactly which checker is indicating the error. Although FIG. 5 shows all the sets (rows) to be the same size, $n$, this clearly is not required; each intermediate RCCO circuit can reduce different size sets.

If a finer degree of resolution (failure location) is required than can be provided using the circuit in FIG. 5 it is possible to obtain such resolution by using the Array Reduction Analysis Circuit shown in FIG. 6. The price paid for ARAC is an increase in the number of RCCO and logout circuits. However, the number used in ARAC is still much less than the number used in FIG. 4 for exhaustive logout of all checkers. (The number of logout paths in ARAC approaches $2(1+\sqrt{N})$ instead of $N+1$.)

For correct use of the ARAC it is mandatory that the assignment of checkers to rows be such that it is impossible for any single failure to cause checkers in different rows to indicate errors at the same time. This means that at most one intermediate row RCCO can be indicating an error at a time. It is still true that the rows may be of different size, in which case $n$

TABLE 1

| Machine state | Line pair status | | | |
|---|---|---|---|---|
| | $L_0$ | $L_1 \cdots$ | $L_i \cdots$ | $L_N$ |
| No failures | odd | odd $\cdots$ | odd $\cdots$ | odd |
| RCCO failed | even | odd $\cdots$ | odd $\cdots$ | odd |
| $C_1$ or logic checked by $C_1$ failed | even | even $\cdots$ | odd $\cdots$ | odd |
| . | . | . | . | . |
| $C_i$ or logic checked by $C_i$ failed | even | odd $\cdots$ | even $\cdots$ | odd |
| . | . | . | . | . |
| $C_N$ or logic checked by $C_N$ failed | even | odd $\cdots$ | odd $\cdots$ | even |
| Machine logic failed with error propagation | even | (At least two pairs even) | | |

Table 1—Diagnostic analysis table for Fig. 4.

In each case the status is indicated when one of the known code inputs which tests the given failure is being applied; otherwise all line pairs would be odd. The central rows of the table show what happens when a failure occurs in the machine logic without error propagation to any checker other than the one which monitors the failed logic. The last row of the table shows that when the machine is designed so that errors due to a single failure can propagate before a check occurs, it is possible to have several checkers and the RCCO putting out even-parity signals simultaneously.

Since the RCCO output, $L_0$, is always even after a failure, it is used to stop the machine as indicated by its connection to the stopping switch, SS. A diagnosis can than be accomplished by reading values off the N+1 logout indicators (these can be is the length of the longest row. Table 2 gives the complete failure location strategy for the ARAC.

TABLE 2

| Case | Symptom* (logout indicating even) | Diagnosis (location of failure) |
|---|---|---|
| 1 | None | Stopping switch failed. |
| 2 | $RL_0$ | RCCO generating $RL_0$ failed. |
| 3 | $CL_0$ | RCCO generating $CL_0$ failed. |
| 4† | $RL_0, RL_i$ | RCCO generating $RL_i$ failed. |
| 5† | $CL_0, CL_j$ | RCCO generating $CL_j$ failed. |
| 6† | $RL_0, CL_0, RL_i$ and several $CL_j$. | Those checkers in row $i$ corresponding to even values of $CL_j$ are in error state. |

*All other symptoms indicate a multiple failure.
†In these cases $i=1, \ldots, m$ and $j=1, \ldots, n$.
Table 2—Diagnostic table for ARAC.

It is seen that every failure stops the machine and the logout can be used to indicate exactly which checkers are indicating errors. In particular, it is possible to locate failures in the ARAC itself (usually indicated by $CL_0$ or $RL_0$, but not both, even). When ARAC is nonfailed, the even entry in the row logout $RL_1...RL_i... RL_m$ points to the row which contains the checkers indicating errors and the column logout $CL_1... CL_j.... CL_n$ contains the values of the checkers in that row. This is because the previous placement restriction insured that only one checker in any column could be even that this has to be in the one row indicated by the row logout.

The ARAC is by far the most sophisticated system use of self-testing checking circuits.

It is also possible to use self-testing checking circuits to initiate a self-repairing action on a computer designed with this capability. FIG. 7 shows a simple self-repairing system interface with two sending modules, two receiving modules and an encoded status register controlling the interface. Such self-repairing interfaces are described in great detail in copending application Ser. No. 744,888 referenced previously. Self-testing checking circuits are shown attached to each sending module. It is only necessary at this point to describe the means by which the checker output can be used to update the status register of this self-repairing system. Examination of the interface shows that it is the single error correction encoded status register which tells each receiver which sending module is to be used.

The majority voting circuit, MAJ, is used as a decoder to produce an output whenever two or three of the flip-flops FF are 1 whereas the minority circuit, MIN, produces an output whenever one or none of the flip-flops are 1. In this way the MAJ and MIN circuits decode and selectively gate one of the two sending modules into the receiver even when one flip-flop is in error, i.e., when only one or two flip-flops are 1.

The checker-to-status translator circuit in FIG. 7 is the means in question. Each equivalence gate produces a signal when the checker driving it has even parity, i.e., indicates an error. Assume the status register is in the 0 state so that sending module 1, $SM_1$, is being used. When $SM_1$ fails, its checker puts out even parity, the status register is set to 1 and the receivers now use sending module 2, $SM_2$. If at some latter time $SM_2$ fails, its checker will produce even parity, thereby attempting a reset of the status register back to 0. If $SM_1$ is now functioning correctly (it may have had a transient failure) $SM_1$ will now be reselected by the receivers. If $SM_1$ is still failed, the first time an error is sent to the checker a switch to $SM_2$ will result. Thus when all sending modules have failed the system will bounce back and forth between $SM_1$ and $Sm_2$. Failures in the checker-to-status translator are indistinguishable from failures in the encoded status register. Thus, each pair of equivalence gates should be packaged with the flip-flop they drive. Then failures in the checker-to-status translator means (and the flip-flop) can be detected by analyzing the logout status mechanism attached to the status register.

FIG. 8 shows a slightly different use for the same translator/stator mechanism just described. Here the status register is merely used to turn power off on the unused sending module. Again, majority and minority gates are used, as shown, to decode the status information and make the actual determination as to which module should be turned off. It is assumed that all outputs from that module appear as logical 0's. Hence the receiver ignores that sending module used and the checker-to-status translator sees even parity, two 0's, coming from it. The result is such that the failed (power-off) module is logically removed from the system.

From previous description of the system use of the individual self-testing error checkers and the organization of the reduction circuits shown in FIGS. 4, 5, and 6, it will be noted that a number of different configurations can be utilized for achieving a desired amount of fault location with minimal checking circuitry. It will of course be obvious that many other circuitry configurations should still be utilized to, perhaps, give some slight extra degree of fault location with an attendant increase in hardware cost. However, in any event, it will be apparent that it is absolutely necessary that the output of the various reduction circuits, as well as the error checkers themselves, be multiple output, e.g., here two rail is used with complementary bits on two output lines when the checking circuits and the reduction circuits are functioning correctly and the various inputs are correct, i.e., no error condition. Also, the various types of essentially fail-safe indicating circuits, such as the stopping switch and logout status light shown could have wide design variations, the important thing being that any failures be detectable.

It will also be apparent that wide latitudes of possible alternative circuit designs for a self-repairing computer configuration, other than those shown in FIGS. 7 and 8, would similarly be possible utilizing the basic teachings of the present invention.

As stated previously in the description of FIGS. 7 ad 8, the output from the checking system in each module is utilized to provide an input to the combination status register-translation circuitry disclosed. It will also be noted that this particular circuitry is in essence TMR'd (Triple Modular Redundancy) and that the outputs of the status register are monitored by the voting circuitry, i.e., MIN and MAJ blocks. It should be understood that this is merely one highly reliable method of controlling the switching of a redundant, high-reliability computer organization and that many other reconfiguration methods could equally well be used. In particular, any error correction code could be used in the status register with corresponding decoders in the receiving modules.

While the invention has been particularly shown and described with reference to preferred embodiments thereof, it will be understood by those skilled in the art that various changes in form and details may be made therein without departing from the spirit and scope of the invention.

What is claimed is:

1. A self-testing error-checking system for inclusion in a computer including a plurality of individual two output signal pair error-checking circuits connected to various portions of the computer, each error-checking circuit having its output signal pair in a code state when the inputs are all correct and the checking circuit itself is functioning properly said system comprising, at least one two-output reduction circuit means for receiving the outputs from a plurality of said two-output checkers, said reduction circuit producing an output signal pair in the code state when all inputs are correct and said circuit is itself functioning properly and a single failure tolerant means for producing a system failure indication whenever the output signal pair from said reduction circuit is in an error state and wherein the error and code states are selectively chosen from a first identical code pattern and a second complementary code pattern wherein when the error state is represented by the second code pattern the code state is represented by the first code pattern and when the error state is represented by the first code pattern the code state is represented by the first code pattern.

2. A self-testing error-checking system as set forth in claim 1 wherein said means for producing a system failure indication includes a plurality of logout status light means connected to each output of said reduction circuit means whereby a failure of any single indicating light therein will be visible if an incorrect output is caused thereby.

3. A self-testing error-checking system as set forth in claim 1 wherein said means for producing a system failure indication comprises a fail-safe stopping switch means connected to the output signal pair of said reduction circuit means for interrupting further operation of said computer until an error is corrected, said switch means being constructed so that a single failure of any logic block therein will either not affect the operation of the switch or cause a stoppage of said computer system.

4. A self-testing error-checking system as set forth in claim 1 wherein said checking circuits are arranged in rows and columns wherein each row of checking circuits is connected to a first set of primary reduction circuits and wherein each column of said checking circuits is connected to a second set of said primary reduction circuit means, each said primary reduction circuit means having a failure indication means connected to the output thereof whereby an error output from any of said checkers will produce an error indication in both the output indication means connected to said first set and the said second set of said primary reduction circuit means.

5. A self-testing error-checking system as set forth in claim 4 wherein each of said two sets of primary reduction circuit means is connected to a separate secondary reduction circuit means, the outputs of said secondary reduction circuit means being operative to actuate failure indication means and to interrupt system operation when an error is detected either in one of their inputs or in the secondary reduction circuit means per se.

6. A self-testing error-checking system as set forth in claim 1 wherein said computing system comprises at least one set of redundant modules connected to at least one utilization means, each module having such a checking system included therein, means for applying the two-rail output from the checking system for each said module to a reconfiguration control circuit means, said reconfiguration means including means for excluding a malfunctioning module and substituting a properly functioning module therefor in the system.

7. A self-testing error-checking system for use with a redundant computer configuration as set forth in claim 6 wherein said reconfiguration control circuit means includes status register means having a settable state for each available module, means for setting a given state of said status register in accordance with the output of said error-checking system included with each module wherein said status register means utilizes circuitry for a single error correction encoding of the state and the output of said status register includes local decoding logic whereby any single failures in said status register means will not affect the operation of the system.

8. A self-testing error-checking system as set forth in claim 7 wherein the locally decoded output of the encoded status register is utilized to, in effect, turn the power off in a malfunctioning module.

9. A self-testing error-checking system as set forth in claim 7 wherein the locally decoded output of said encoded status register switches the output from a just-failed module to the output of another standby module upon detection of an error and means for automatically affecting retry of a previously failed module.

* * * * *